(12) United States Patent
Dierberger

(10) Patent No.: US 9,958,160 B2
(45) Date of Patent: May 1, 2018

(54) GAS TURBINE ENGINE COMPONENT WITH UPSTREAM-DIRECTED COOLING FILM HOLES

(71) Applicant: United Technologies Corporation, Hartford, CT (US)

(72) Inventor: James A. Dierberger, Hebron, CT (US)

(73) Assignee: United Technologies Corporation, Farmington, CT (US)

( * ) Notice: Subject to any disclaimer, the term of this patent is extended or adjusted under 35 U.S.C. 154(b) by 206 days.

(21) Appl. No.: 14/765,222

(22) PCT Filed: Feb. 4, 2014

(86) PCT No.: PCT/US2014/014582
§ 371 (c)(1),
(2) Date: Jul. 31, 2015

(87) PCT Pub. No.: WO2014/123850
PCT Pub. Date: Aug. 14, 2014

(65) Prior Publication Data
US 2015/0369487 A1 Dec. 24, 2015

Related U.S. Application Data

(60) Provisional application No. 61/761,491, filed on Feb. 6, 2013.

(51) Int. Cl.
| | | |
|---|---|---|
| *F23R 3/06* | (2006.01) | |
| *F01D 25/12* | (2006.01) | |
| *F01D 25/30* | (2006.01) | |
| *F23R 3/00* | (2006.01) | |

(52) U.S. Cl.
CPC .............. *F23R 3/06* (2013.01); *F01D 25/12* (2013.01); *F01D 25/30* (2013.01); *F23R 3/002* (2013.01); *F23R 3/005* (2013.01); *F05D 2260/202* (2013.01); *F05D 2260/4031* (2013.01); *F23R 2900/03041* (2013.01); *F23R 2900/03042* (2013.01); *F23R 2900/03044* (2013.01); *Y02T 50/676* (2013.01)

(58) Field of Classification Search
CPC .. F23R 3/06; F23R 3/002; F23R 3/005; F23R 2900/03041; F23R 2900/03042; F23R 2900/03044; F01D 25/12; F01D 25/30
See application file for complete search history.

(56) References Cited

U.S. PATENT DOCUMENTS

| | | |
|---|---|---|
| 3,986,347 A | 10/1976 | Schirmer |
| 4,012,902 A | 3/1977 | Schirmer |
| 4,242,871 A | 1/1981 | Breton |
| 4,380,905 A | 4/1983 | Smart et al. |

(Continued)

FOREIGN PATENT DOCUMENTS

EP    2273196    1/2011

OTHER PUBLICATIONS

Yusop et al., "Effusion Film Cooling: Adiabatic Cooling Effectiveness of Two Multihole Patterns", University of Leeds, Leeds LS2 9JT, United Kingdom, 2007.

*Primary Examiner* — Steven Sutherland
(74) *Attorney, Agent, or Firm* — O'Shea Getz P.C.

(57) ABSTRACT

A component within a gas turbine engine includes a surface with one or more upstream-directed cooling film holes therethrough.

8 Claims, 10 Drawing Sheets

(56) References Cited

U.S. PATENT DOCUMENTS

| | | | |
|---|---|---|---|
| 4,655,044 A | 4/1987 | Dierberger et al. | |
| 4,763,481 A | 8/1988 | Cannon | |
| 4,843,825 A | 7/1989 | Clark | |
| 4,896,510 A * | 1/1990 | Foltz | F23M 5/085 |
| | | | 60/757 |
| 5,079,915 A | 1/1992 | Veau | |
| 5,169,287 A | 12/1992 | Proctor et al. | |
| 5,181,379 A | 1/1993 | Wakeman et al. | |
| 5,230,214 A * | 7/1993 | Pechette | F02K 1/04 |
| | | | 60/725 |
| 5,233,828 A | 8/1993 | Napoli | |
| 5,261,223 A | 11/1993 | Foltz | |
| 5,271,220 A | 12/1993 | Holmes et al. | |
| 5,279,127 A | 1/1994 | Napoli | |
| 5,323,604 A | 6/1994 | Ekstedt et al. | |
| 5,619,855 A | 4/1997 | Burrus | |
| 5,623,827 A | 4/1997 | Monty | |
| 5,630,319 A | 5/1997 | Schilling et al. | |
| 5,657,633 A | 8/1997 | Brueggert | |
| 5,826,431 A * | 10/1998 | Makino | B23K 26/388 |
| | | | 60/754 |
| 6,237,344 B1 | 5/2001 | Lee | |
| 6,279,323 B1 | 8/2001 | Monty et al. | |
| 6,286,298 B1 | 9/2001 | Barrus et al. | |
| 6,314,717 B1 | 11/2001 | Teets et al. | |
| 6,374,615 B1 | 4/2002 | Zupanc et al. | |
| 6,540,162 B1 | 4/2003 | Johnson et al. | |
| 6,655,147 B2 | 12/2003 | Farmer et al. | |
| 6,711,900 B1 * | 3/2004 | Patel | F23R 3/06 |
| | | | 60/752 |
| 6,736,338 B2 | 5/2004 | Johnson et al. | |
| 7,093,439 B2 | 8/2006 | Pacheco-Tougas et al. | |
| 7,093,441 B2 | 8/2006 | Burd et al. | |
| 7,363,763 B2 | 4/2008 | Coughlan, III et al. | |
| 7,681,398 B2 | 3/2010 | Patel et al. | |
| 7,721,548 B2 | 5/2010 | Patel et al. | |
| 7,748,221 B2 | 7/2010 | Patel et al. | |
| 7,886,540 B2 | 2/2011 | Webb | |
| 7,954,325 B2 | 6/2011 | Burd et al. | |
| 8,015,829 B2 | 9/2011 | Coughlan, III et al. | |
| 8,171,735 B2 | 5/2012 | Mancini et al. | |
| 2003/0213250 A1 | 11/2003 | Pacheco-Tougas et al. | |
| 2005/0061004 A1 | 3/2005 | Colibaba-Evulet et al. | |
| 2006/0196188 A1 * | 9/2006 | Burd | F23R 3/002 |
| | | | 60/754 |
| 2007/0059178 A1 | 3/2007 | Shapiro | |
| 2008/0256955 A1 | 10/2008 | Parkman et al. | |
| 2010/0095678 A1 | 4/2010 | Hawie et al. | |
| 2010/0223931 A1 | 9/2010 | Chila et al. | |
| 2010/0240584 A1 | 9/2010 | Berdou et al. | |
| 2010/0293957 A1 | 11/2010 | Chen et al. | |
| 2011/0126543 A1 | 6/2011 | Kirsopp | |
| 2013/0000309 A1 | 1/2013 | Dierberger | |
| 2013/0019603 A1 | 1/2013 | Dierberger et al. | |

* cited by examiner

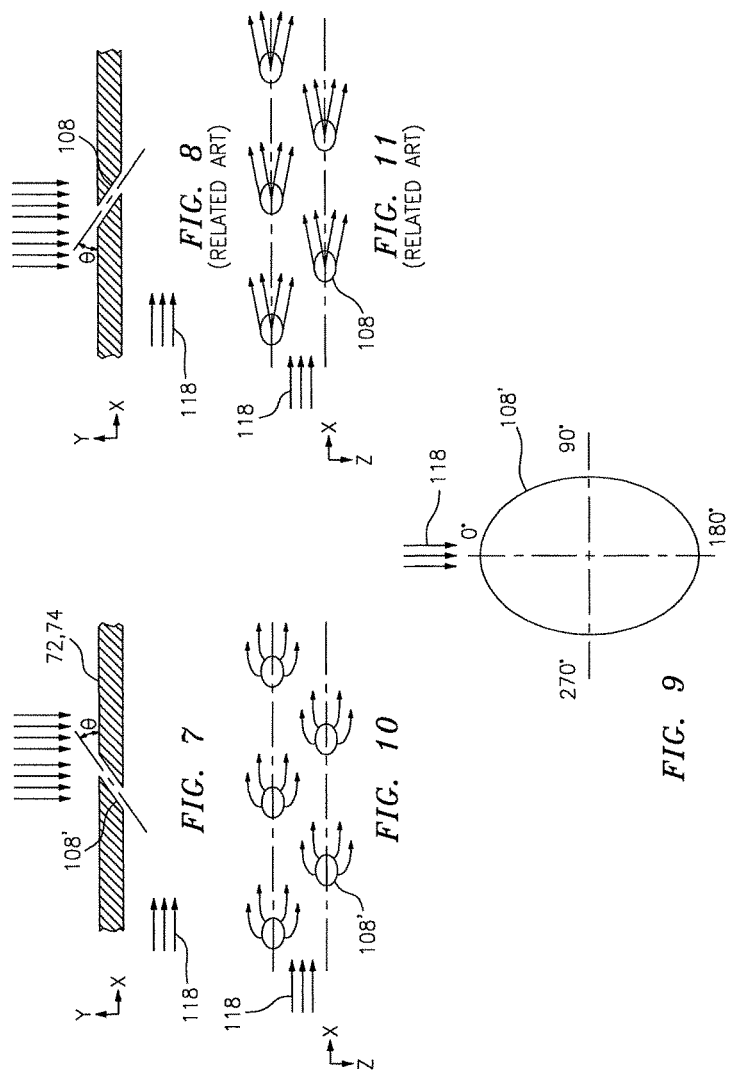

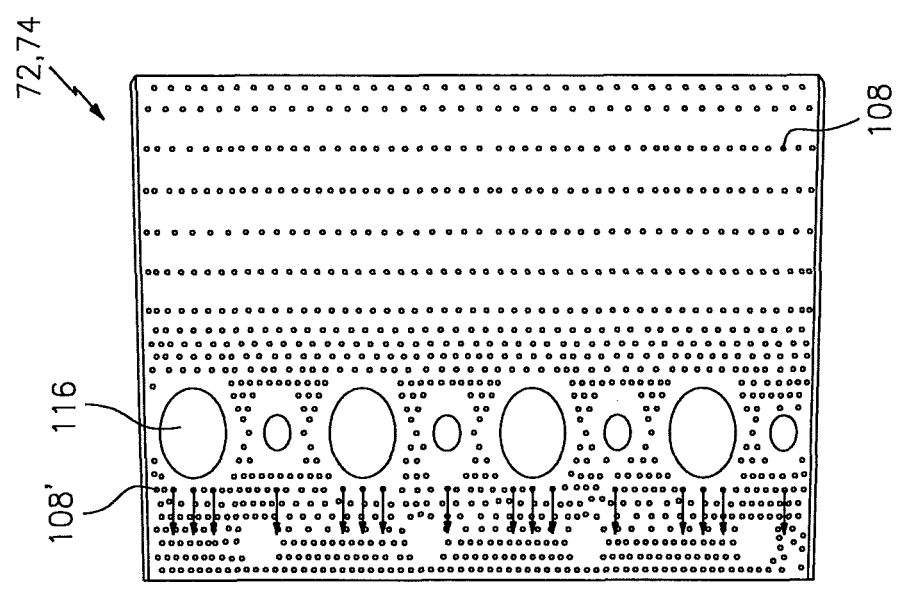
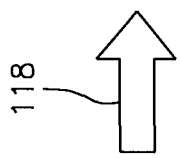
FIG. 12

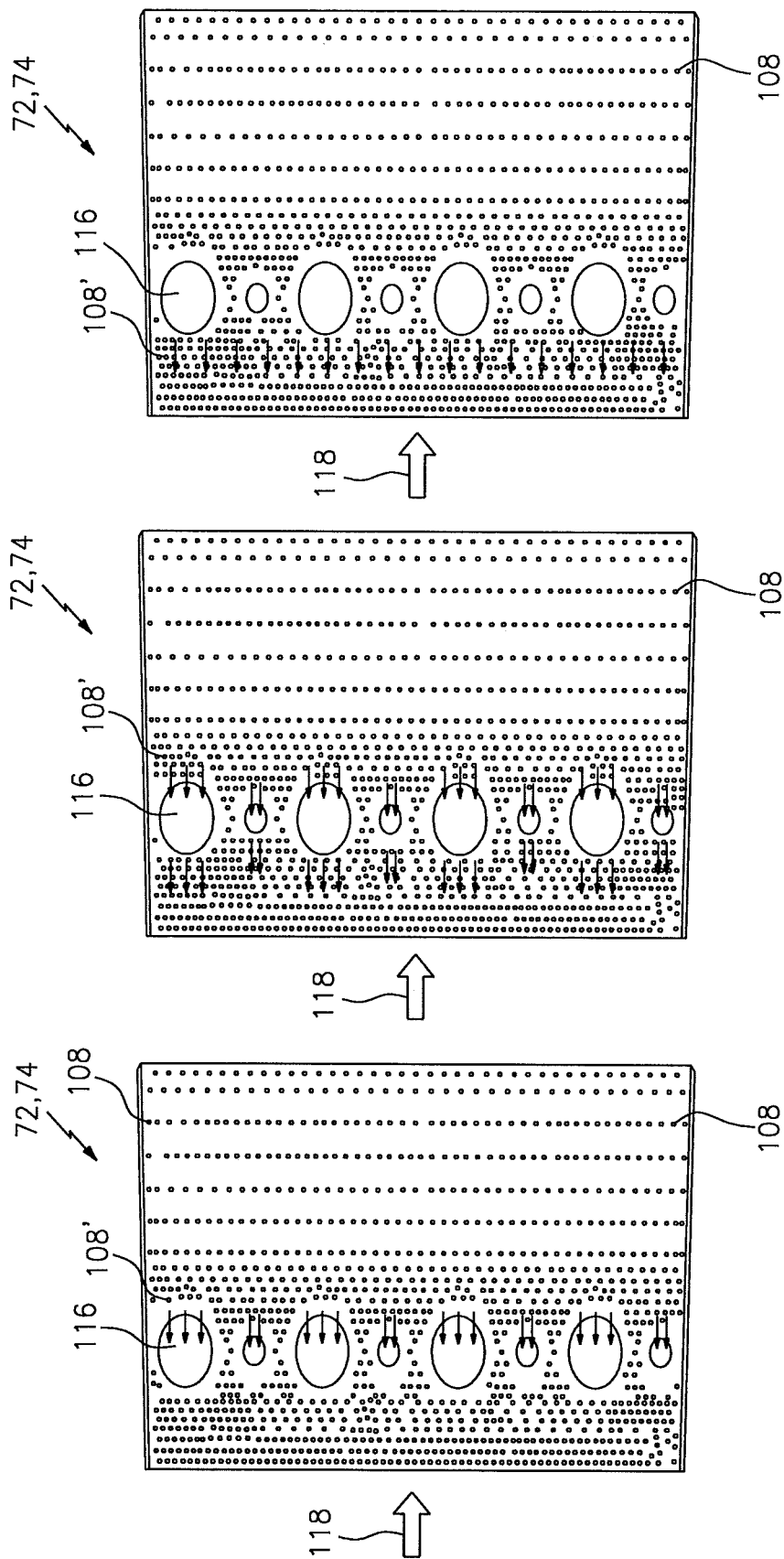

GAS TURBINE ENGINE COMPONENT WITH UPSTREAM-DIRECTED COOLING FILM HOLES

This application claims priority to PCT Patent Application No. PCT/US14/14582 filed Feb. 4, 2014, which claims priority to U.S. Patent Application No. 61/761,491 filed Feb. 6, 2013.

BACKGROUND

The present disclosure relates to a gas turbine engine and, more particularly, to a cooling arrangement therefor.

Gas turbine engines, such as those that power modern commercial and military aircraft, generally include a compressor section to pressurize an airflow, a combustor section for burning a hydrocarbon fuel in the presence of the pressurized air, and a turbine section to extract energy from the resultant combustion gases.

Gas turbine engines components, such as combustor sections, augmentor sections and exhaust duct liners are subject to high thermal loads for prolonged time periods. Historically, various cooling arrangements are provided to film cool the component. Among these are impingement cooling on a backside of the component and film cooling on a gas side of the component to maintain temperatures within material limits.

SUMMARY

A component within a gas turbine engine according to one disclosed non-limiting embodiment of the present disclosure includes a surface with one or more upstream-directed cooling film holes therethrough.

A further embodiment of the present disclosure includes, wherein the one or more upstream-directed cooling film holes are angled between 270 degrees and 90 degrees with respect to a main gas flow directed from 0 Degrees to 180 degrees proximate to each of the one or more upstream-directed cooling film holes.

A further embodiment of any of the foregoing embodiments of the present disclosure includes, wherein the one or more upstream-directed cooling film holes are adjacent to a hole through a heat shield in a combustor section.

A further embodiment of any of the foregoing embodiments of the present disclosure includes, wherein the hole is a dilution hole.

A further embodiment of any of the foregoing embodiments of the present disclosure includes, wherein the one or more upstream-directed cooling film holes are forward of the dilution hole.

A further embodiment of any of the foregoing embodiments of the present disclosure includes, wherein the one or more upstream-directed cooling film holes are aft of the dilution hole.

A further embodiment of any of the foregoing embodiments of the present disclosure includes, wherein the one or more upstream-directed cooling film holes are through a tail cone in an augmentor section.

A further embodiment of any of the foregoing embodiments of the present disclosure includes, wherein the one or more upstream-directed cooling film holes are through a liner in an exhaust duct section.

A method of film cooling that reduces average heat transfer in a gas turbine engine according to another disclosed non-limiting embodiment of the present disclosure includes directing cooling film airflow through one or more upstream-directed cooling film holes.

A further embodiment of any of the foregoing embodiments of the present disclosure includes locating the one or more upstream-directed cooling film holes within a combustor section.

A further embodiment of any of the foregoing embodiments of the present disclosure includes locating the one or more upstream-directed cooling film holes within a heat shield.

A further embodiment of any of the foregoing embodiments of the present disclosure includes locating the one or more upstream-directed cooling film holes within an augmentor section.

A further embodiment of any of the foregoing embodiments of the present disclosure includes locating the one or more upstream-directed cooling film holes within a tail cone.

A further embodiment of any of the foregoing embodiments of the present disclosure includes locating the one or more upstream-directed cooling film holes within an exhaust duct section.

A further embodiment of any of the foregoing embodiments of the present disclosure includes locating the one or more upstream-directed cooling film holes within a liner.

A further embodiment of any of the foregoing embodiments of the present disclosure includes locating the one or more upstream-directed cooling film holes adjacent a dilution hole.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 7 is a sectional view of a heat shield with upstream-directed cooling film holes according to one non-limiting embodiment;

FIG. 8 is a sectional view of a RELATED ART heat shield with downstream-directed cooling film holes;

FIG. 9 is an expanded plan view of an upstream-directed cooling film hole angle orientation;

FIG. 10 is an expanded plan view of a heat shield with upstream-directed cooling film holes according to another non-limiting embodiment;

FIG. 11 is an expanded plan view of a RELATED ART heat shield with downstream-directed cooling film holes;

FIG. 12 is an expanded sectional view of a heat shield with upstream-directed cooling film holes according to another non-limiting embodiment;

FIG. 13 is an expanded sectional view of a heat shield with upstream-directed cooling film holes according to another non-limiting embodiment;

FIG. 14 is an expanded sectional view of a heat shield with upstream-directed cooling film holes according to another non-limiting embodiment;

FIG. 15 is an expanded sectional view of a heat shield with upstream-directed cooling film holes according to another non-limiting embodiment.

DETAILED DESCRIPTION

Figure 1:
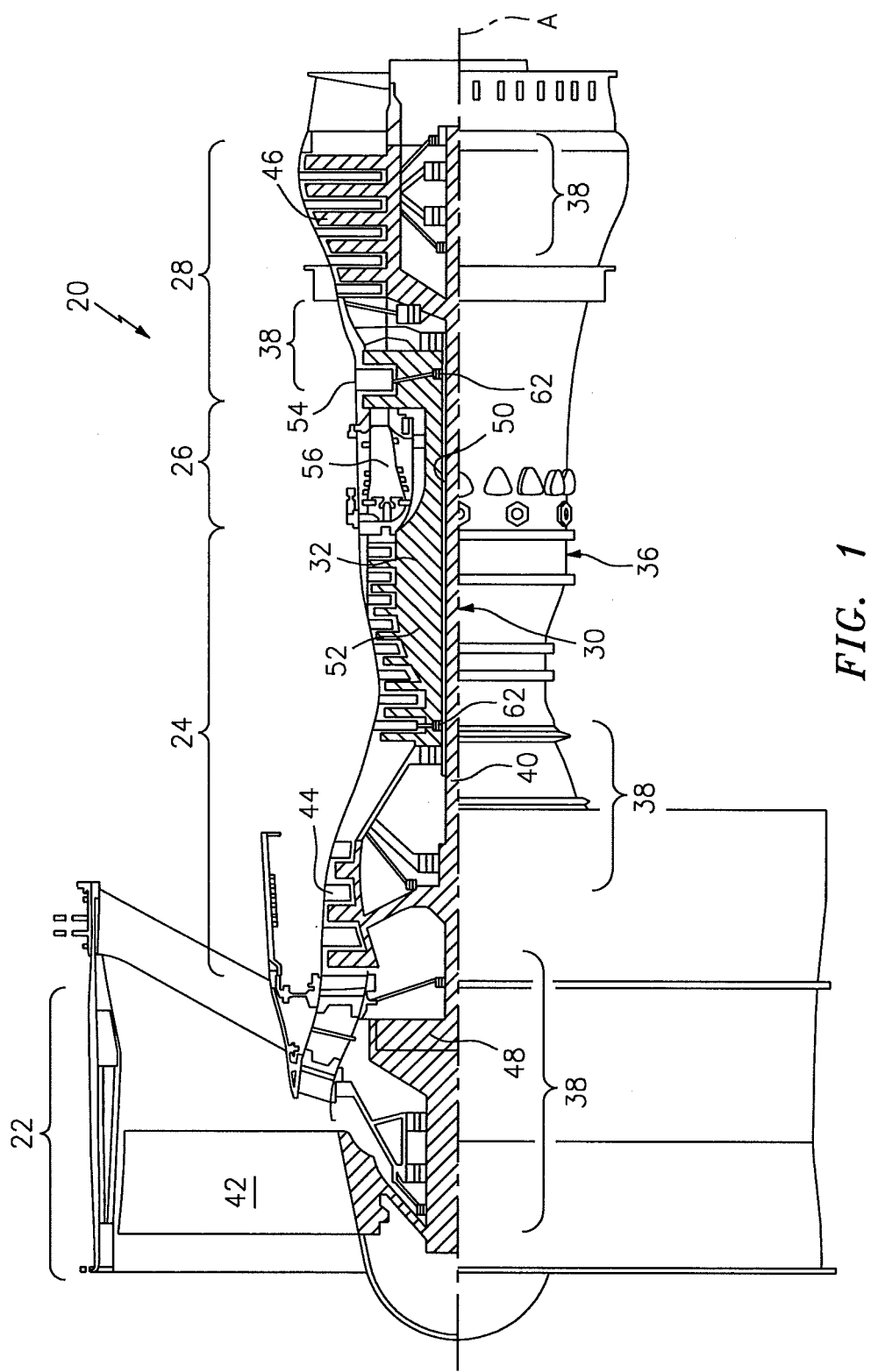
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded through the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. It should be appreciated that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about five (5:1). It should be appreciated, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one non-limiting embodiment of the example gas turbine engine 20 is less than about 1150 fps (351 m/s).

Figure 2:
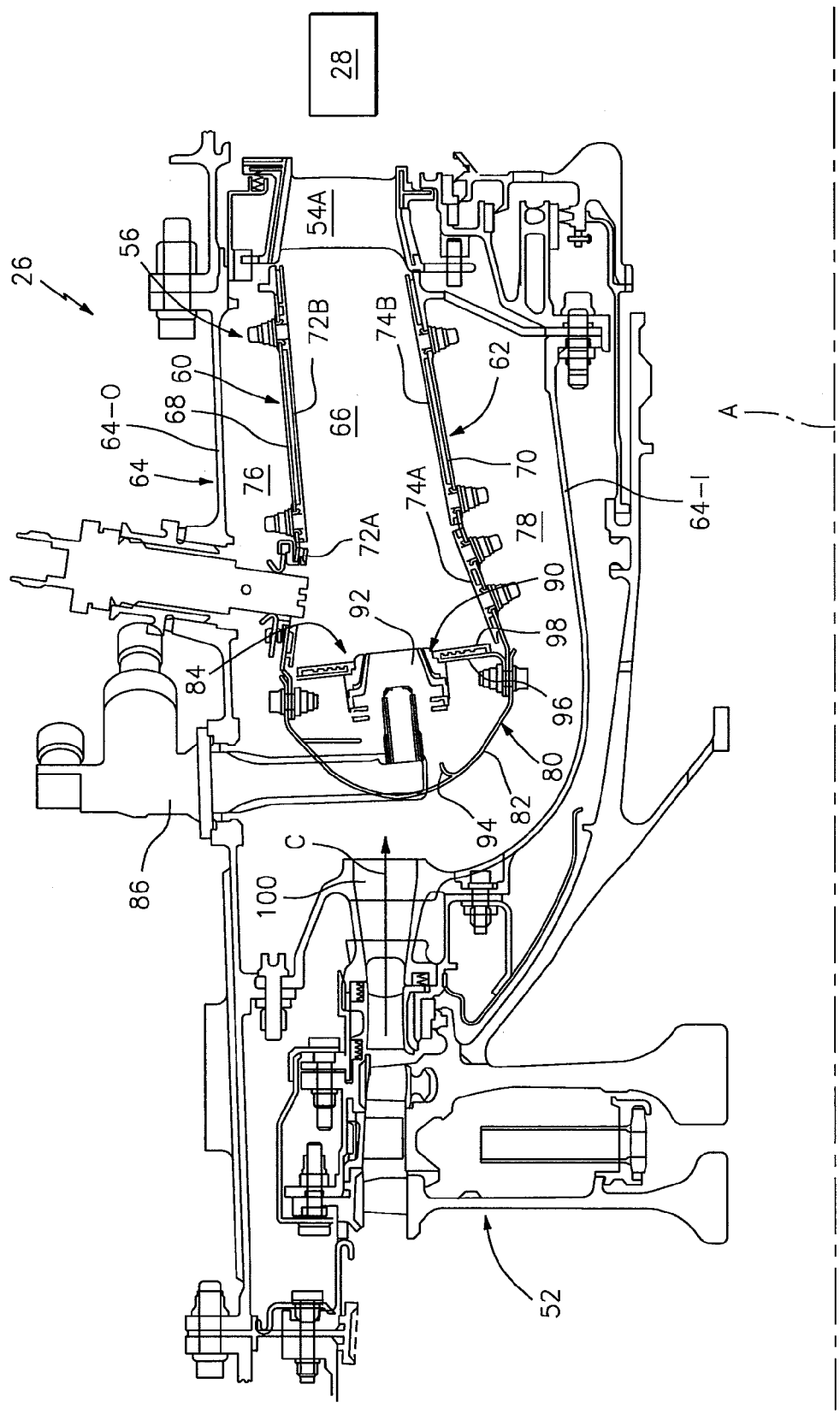
FIG. 2 is an expanded longitudinal schematic sectional view of a combustor section according to one non-limiting embodiment that may be used with the gas turbine engine shown in FIG. 1.

With reference to FIG. 2, the combustor 56 generally includes an outer combustor liner assembly 60, an inner combustor liner assembly 62 and a diffuser case module 64. The outer combustor liner assembly 60 and the inner combustor liner assembly 62 are spaced apart such that a combustion chamber 66 is defined therebetween. The combustion chamber 66 is generally annular in shape.

The outer combustor liner assembly 60 is spaced radially inward from an outer diffuser case 64-O of the diffuser case module 64 to define an outer annular plenum 76. The inner combustor liner assembly 62 is spaced radially outward from an inner diffuser case 64-I of the diffuser case module 64 to define an inner annular plenum 78. It should be appreciated that although a particular combustor is illustrated, other combustor types with various combustor liner arrangements will also benefit herefrom. It should be further appreciated that the disclosed cooling flow paths are but an illustrated embodiment and should not be limited only thereto.

The combustor liner assemblies 60, 62 contain the combustion products for direction toward the turbine section 28.

Each combustor liner assembly 60, 62 generally includes a respective support shell 68, 70 which supports one or more heat shields 72, 74 mounted to the respective support shell 68, 70. Each of the heat shields 72, 74 may be generally rectilinear and manufactured of, for example, a nickel based super alloy, ceramic or other temperature resistant material and are arranged to form a liner array. In one disclosed non-limiting embodiment, the liner array includes a multiple of forward heat shields 72A and a multiple of aft heat shields 72B that are circumferentially staggered to line the outer shell 68 (also shown in FIG. 3). A multiple of forward heat shields 74A and a multiple of aft heat shields 74B are circumferentially staggered to line the inner shell 70 (also shown in FIG. 3).

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of fuel nozzle guides 90 (one shown). Each of the fuel nozzle guides 90 is circumferentially aligned with one of the hood ports 94 to project through the bulkhead assembly 84. Each bulkhead assembly 84 includes a bulkhead support shell 96 secured to the combustor liner assemblies 60, 62, and a multiple of circumferentially distributed bulkhead heat shields 98 secured to the bulkhead support shell 96 around the central opening 92.

The annular hood 82 extends radially between, and is secured to, the forwardmost ends of the combustor liner assemblies 60, 62. The annular hood 82 includes a multiple of circumferentially distributed hood ports 94 that accommodate the respective fuel nozzle 86 and introduce air into the forward end of the combustion chamber 66 through a central opening 92. Each fuel nozzle 86 may be secured to the diffuser case module 64 and project through one of the hood ports 94 and through the central opening 92 within the respective fuel nozzle guide 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades use this energy to drive the turbine rotor at high speed.

Figure 3:
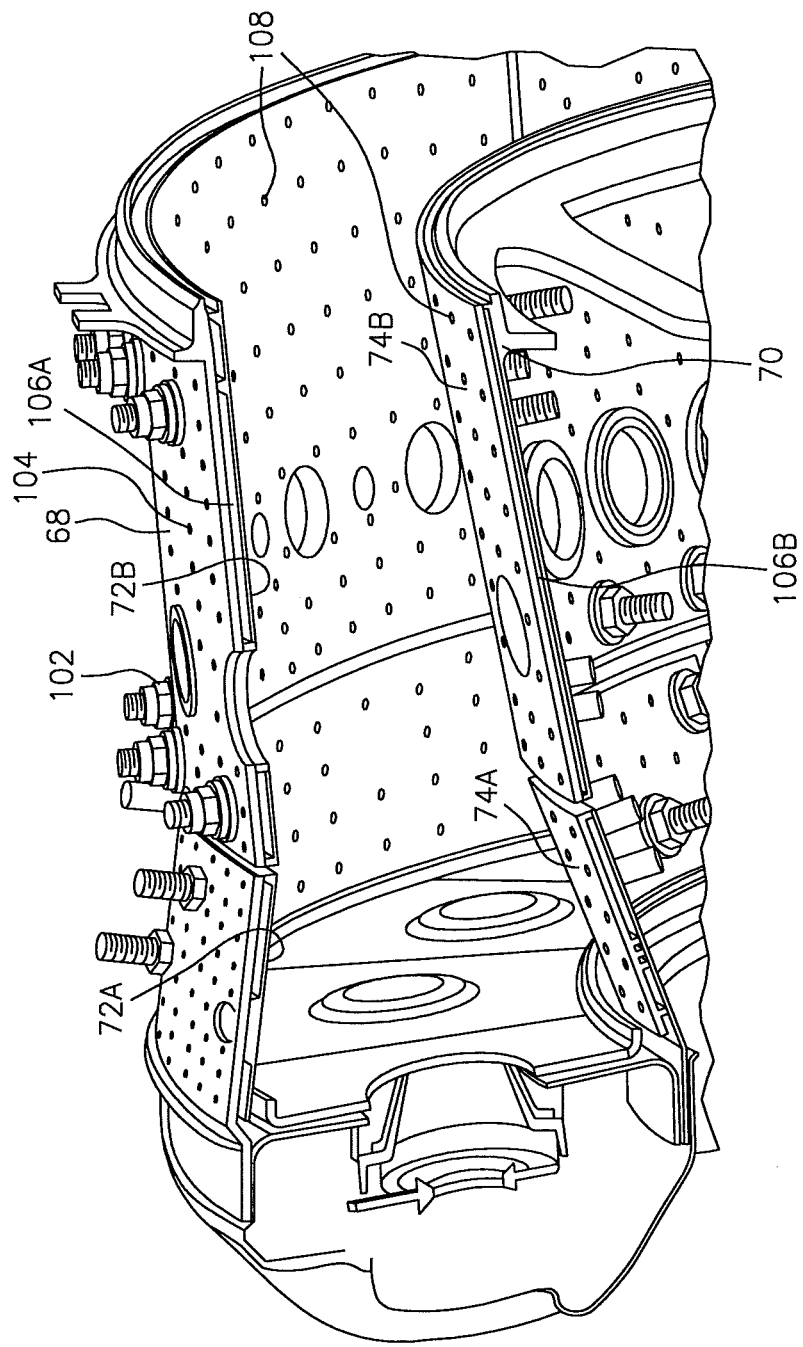
FIG. 3 is an expanded longitudinal schematic partial perspective view of a combustor section according to one non-limiting embodiment that may be used with the gas turbine engine shown in FIG. 1.
Figure 4:
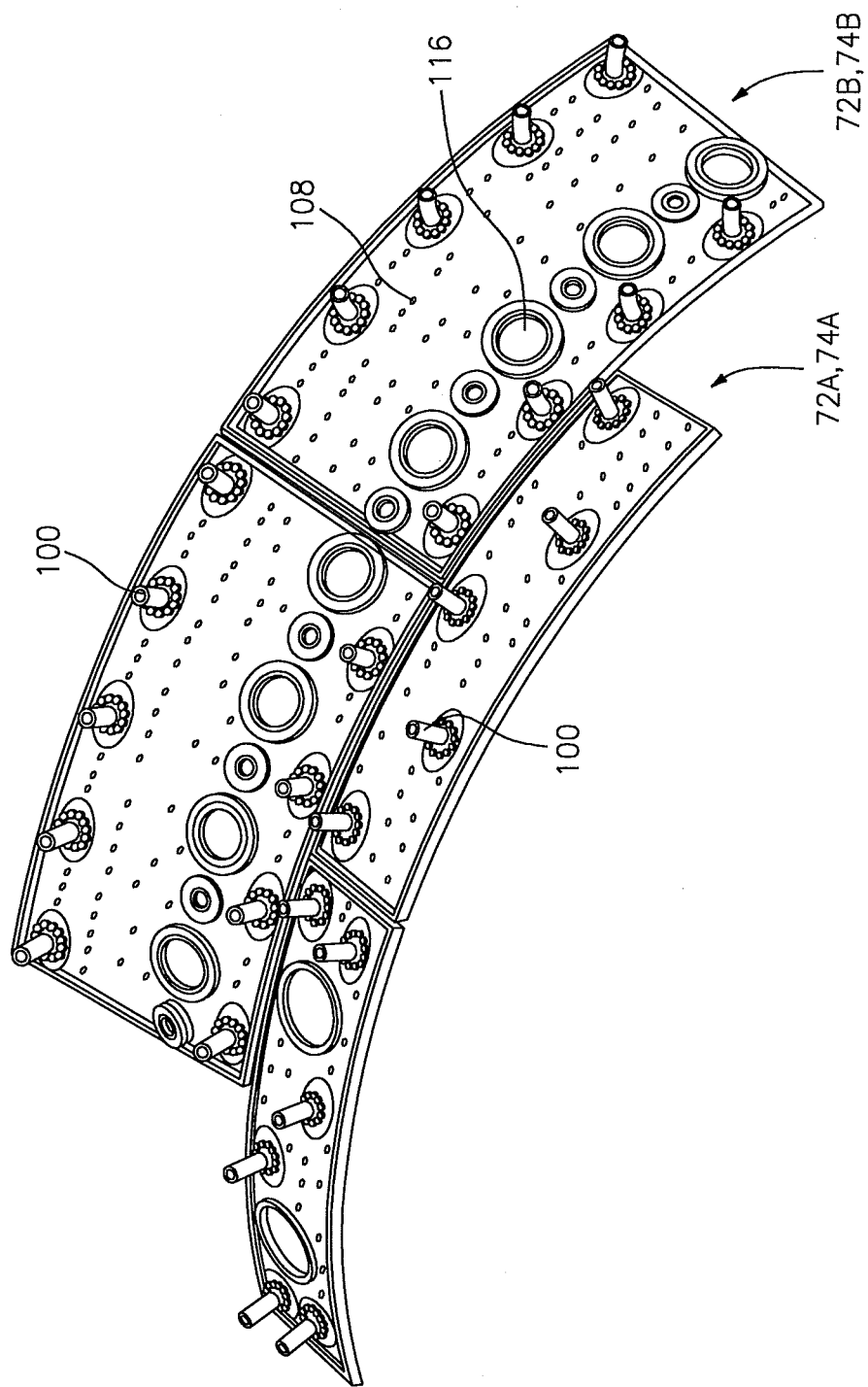
FIG. 4 is an expanded perspective view of a heat shield array from a cold side.

With reference to FIG. 4, a multiple of studs 100 extend from the heat shields 72, 74 to mount the heat shields 72, 74 to the respective support shells 68, 70 with fasteners 102 such as nuts (also shown in FIG. 3). That is, the studs 100 project rigidly from the heat shields 72, 74 and through the respective support shells 68, 70 to receive the fasteners 102 at a threaded distal end section thereof.

Figure 5:
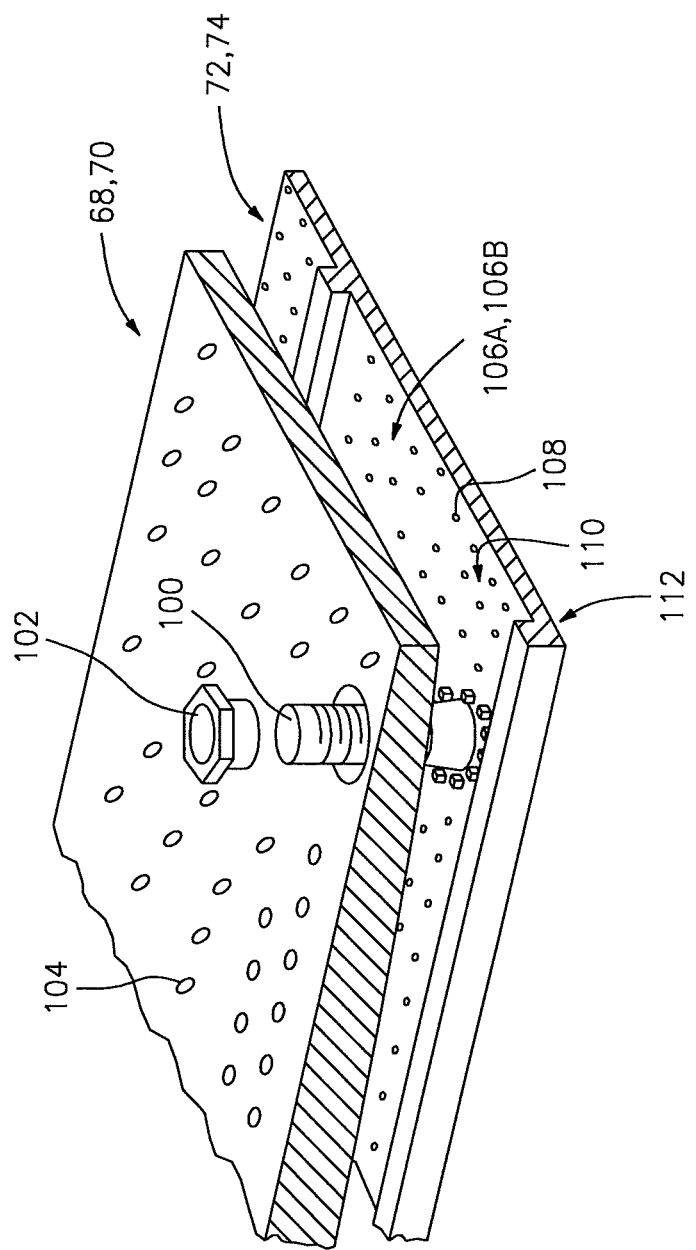
FIG. 5 is an exploded view of a liner assembly of the combustor.

With reference to FIG. 5, a multiple of cooling impingement holes 104 penetrate through the support shells 68, 70 to allow air from the respective annular plenums 76, 78 to enter cavities 106A, 106B (also shown in FIG. 3) formed in the combustor liner assemblies 60, 62 between the respective support shells 68, 70 and heat shields 72, 74. The cooling impingement holes 104 are generally normal to the surface of the heat shields 72, 74. The air in the cavities 106A, 106B provides backside impingement cooling of the heat shields 72, 74 that is generally defined herein as heat removal via internal convection.

A multiple of cooling film holes 108 penetrate through each of the heat shields 72, 74. The geometry of the film holes, e.g., diameter, shape, density, surface angle, incidence angle, etc., as well as the location of the holes with respect to the high temperature main flow also contributes to effusion film cooling. The combination of impingement holes 104 and film holes 108 may be referred to as an Impingement Film Floatwall assembly.

The cooling film holes 108 allow the air to pass from the cavities 106A, 106B defined in part by a cold side 110 of the heat shields 72, 74 to a hot side 112 of the heat shields 72, 74 and thereby facilitate the formation of a film of cooling air along the hot side 112. The cooling film holes 108 are generally more numerous than the impingement holes 104 to promote the development of a film cooling along the hot side 112 to sheath the heat shields 72, 74. Film cooling as defined herein is the introduction of a relatively cooler airflow at one or more discrete locations along a surface exposed to a high temperature environment to protect that surface in the immediate region of the airflow injection as well as downstream thereof.

Figure 6:
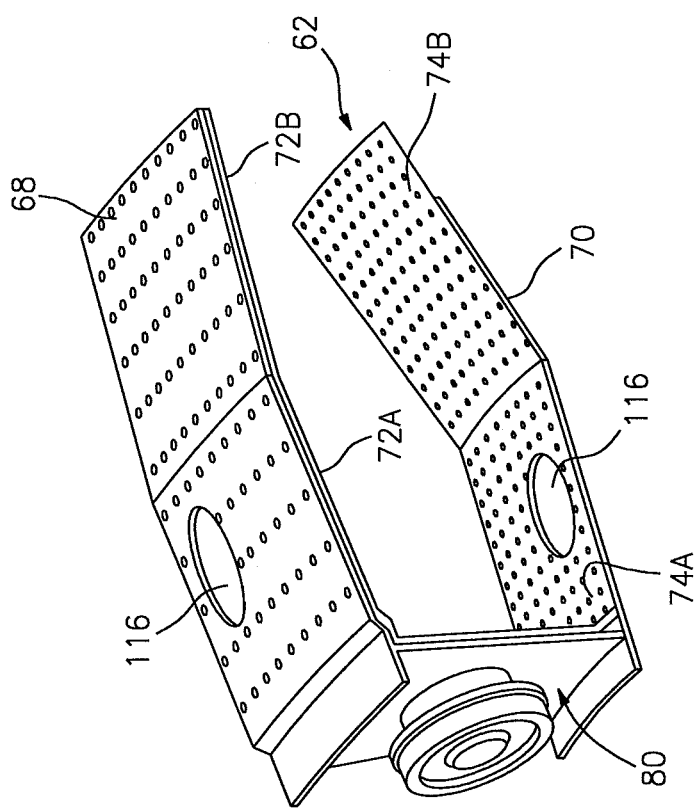
FIG. 6 is an expanded circumferentially partial perspective view of the combustor section.

A multiple of dilution holes 116 penetrate through both the respective support shells 68, 70 and heat shields 72, 74 (FIG. 6). For example only, in a Rich-Quench-Lean (R-Q-L) type combustor, the dilution holes 116 are located downstream of the forward assembly 80 to quench the hot gases by supplying cooling air into the combustor. The hot combustion gases slow towards the dilution holes 116 and may form a stagnation point at the leading edge which becomes a heat source and may challenge the durability of the heat shields 72, 74 proximate this location. At the trailing edge of the dilution hole, due to interaction with dilution jet, hot gases form a standing vortex pair that may also challenge the durability of the heat shields 72, 74 proximate this location. It should be appreciated that other combustor types and other holes such as igniter holes will also benefit herefrom.

With reference to FIG. 7 at least one, a subset or all of the cooling film holes 108 are upstream-directed cooling film holes 108' arranged at an angle to direct the cooling film airflow in an upstream direction. That is, the upstream-directed cooling film holes 108' define an angle to discharge into or towards the main gas flow 118 as compared to a conventional downstream direction (FIG. 8; RELATED ART). It should be appreciated that "upstream" as defined herein includes any direction which is between 270 degrees and 90 degrees with respect to the main gas flow 118 directed from 0 Degrees to 180 degrees (FIG. 9). It should be appreciated that the main gas Flow 118 undergoes, for example, swirling, mixing and various vortices in various locations within the combustion chamber 66 and that the 0 Degree orientation need not be parallel to the engine axis A proximate each particular upstream-directed cooling film Hole 108'. That is, the 0 Degree orientation may be different for each upstream-directed cooling film Hole 108'.

Furthermore, the upstream-directed cooling film holes 108' are arranged at an angle θ through the heat shield 72, 74. Angle θ in one disclosed non-limiting embodiment may be at or around from 45 degrees to 20 degrees. It should be appreciated, however, that any angle θ may benefit herefrom. The upstream-directed cooling film holes 108' may alternatively or additionally be non-cylindrical or shaped to further tailor the flow.

Upstream-directed cooling film holes 108' produce a cooling film (FIG. 10) that may be of a relatively higher effectiveness since the main gas flow 118 causes the cooling film airflow from the upstream-directed cooling film holes 108' to slow and spread out which generally improves coverage as compared to the conventional downstream direction (FIG. 11; RELATED ART).

In one disclosed non-limiting embodiment, the upstream-directed cooling film holes 108' are located forward of the dilution hole 116 (FIG. 12). In another disclosed non-limiting embodiment, the upstream-directed cooling film holes 108' is located aft of the dilution hole 116 (FIG. 13). In yet another disclosed non-limiting embodiment, the upstream-directed cooling film holes 108' are located both forward and aft of the dilution holes 116 (FIG. 14). The upstream-directed cooling film holes 108' may each be associated with single dilution hole 116 or may be continuous and adjacent to a multiple of dilution holes 116 (FIG. 15).

The upstream-directed cooling film holes 108' beneficially facilitates film cooling effectiveness adjacent to the dilution holes 116 by the minimization or prevention of hot gas stationary flow regions typically formed upstream and downstream of the dilution hole. The upstream-directed cooling film holes 108' essentially directs the coolant air to spread in the spanwise direction adjacent to the dilution hole 116 to increase the film coverage. Downstream of the upstream-directed cooling film holes 108' coolant air may form a vortex pair to provide cooling further downstream. Also, the upstream-directed cooling film holes 108' may minimize or prevent cooling jet separation.

The upstream-directed cooling film holes 108' provides an injection of cooling air therefrom which, being opposed by the main gas flow 118, slows and turns to join the direction of the main gas flow 118. This slowing and turning effectively minimizes vortices as compared to conventional downstream-directed cooling film holes 108. The cooling film that forms from the upstream-directed cooling film holes 108' thereby generally provides a more laminar and less turbulent flow which improves the film air-cooling barrier and facilitates formation of film cooling that reduces the average heat transfer.

Figure 16:
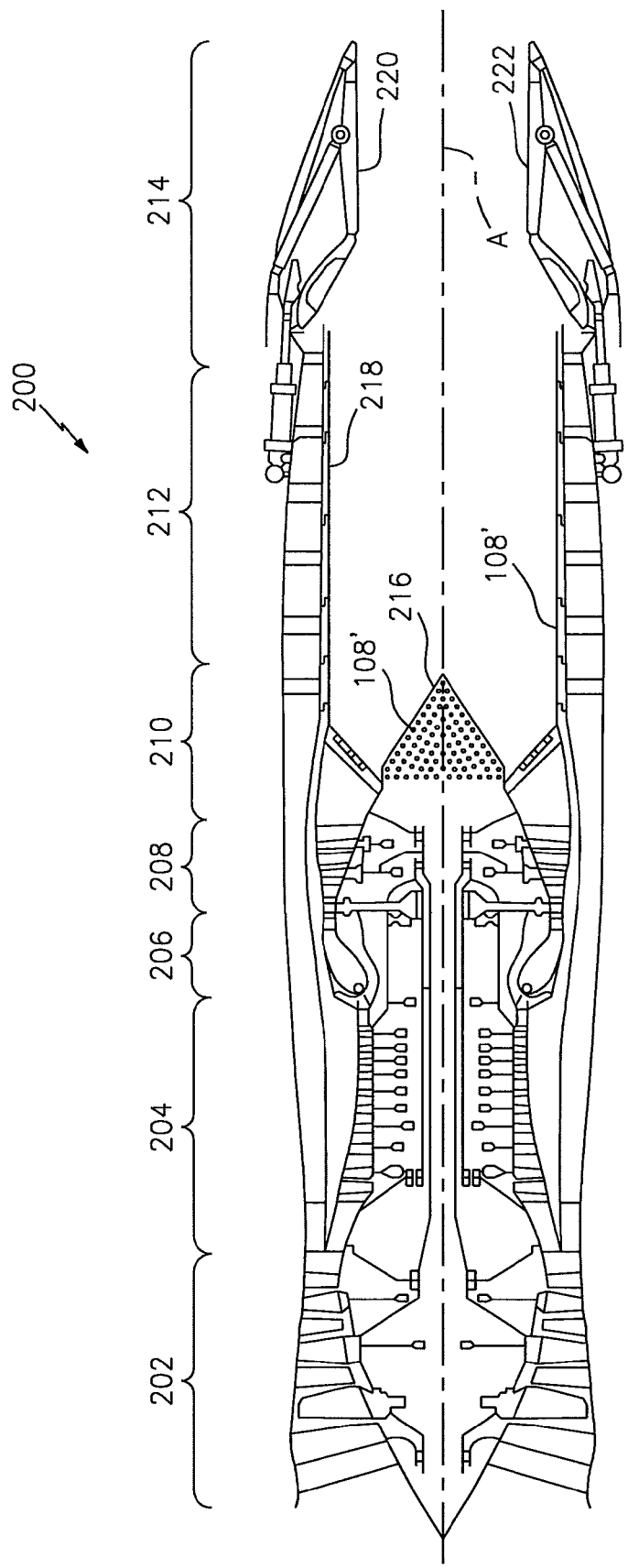
FIG. 16 is a schematic cross-section of a gas turbine engine with upstream-directed cooling film holes according to another non-limiting embodiment

With reference to FIG. 16, the upstream-directed cooling film holes 108' in another disclosed non-limiting embodiment are located in other engine architectures such as a two-spool low-bypass augmented turbofan 200 that generally incorporates a fan section 202, a compressor section 204, a combustor section 206, a turbine section 208, an augmenter section 210, an exhaust duct section 212, and a nozzle section 214 along a central longitudinal engine axis A.

In addition to the combustor section 206, the upstream-directed cooling film holes 108' may alternatively or additionally be located in, for example, a conically shaped tail cone 216 in the augmenter section 210, a liner 218 in the exhaust duct section 212 and a flap 220 or seal 222 in Convergent/Divergent nozzle in the nozzle section 214. The upstream-directed cooling film Holes 108' may also be utilized in, for example, but no limited to, blade outer air seals, blades, vanes, and other components.

Although depicted as an augmented low bypass turbofan in the disclosed non-limiting embodiment, it should be appreciated that the concepts described herein are applicable to other gas turbine engines including geared architecture engines, direct drive turbofans, turbojet, turboshaft, three-stream variable cycle and other engine architectures which utilize cooling holes.

It should be appreciated that relative positional terms such as "forward," "aft," "upper," "lower," "above," "below," and the like are with reference to the noimal operational attitude of the vehicle and should not be considered otherwise limiting.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An apparatus for a gas turbine engine, the apparatus comprising:
   a combustion section comprising a heat shield;
   the heat shield comprising a surface with one or more upstream-directed cooling film holes therethrough;
   the combustion section further comprising a support shell and a cavity formed radially between the support shell and the heat shield;
   the support shell configured with a plurality of impingement apertures fluidly coupled with the cavity;
   the heat shield attached to the support shell; and
   the one or more upstream-directed cooing film holes fluidly coupled with the cavity.

2. The apparatus as recited in claim 1, wherein said one or more upstream-directed cooling film holes are angled between 270 degrees and 90 degrees with respect to a main gas flow directed from 0 degrees to 180 degrees proximate to each of the one or more upstream-directed cooling film holes.

3. The apparatus as recited in claim 1, wherein said one or more upstream-directed cooling film holes are adjacent to a hole through the heat shield.

4. The apparatus as recited in claim 3, wherein said hole is a dilution hole.

5. The apparatus as recited in claim 4, wherein said one or more upstream-directed cooling film holes are forward of said dilution hole.

6. The apparatus as recited in claim 4, wherein said one or more upstream-directed cooling film holes are aft of said dilution hole.

7. The apparatus as recited in claim 1, wherein said one or more upstream-directed cooling film holes are through a liner in an exhaust duct for the gas turbine engine.

8. The apparatus as recited in claim 7, wherein said one or more upstream-directed cooling film holes are angled between 270 degrees and 90 degrees with respect to a main gas flow directed from 0 degrees to 180 degrees proximate to each of the one or more upstream-directed cooling film holes.

\* \* \* \* \*

UNITED STATES PATENT AND TRADEMARK OFFICE
CERTIFICATE OF CORRECTION

PATENT NO. : 9,958,160 B2
APPLICATION NO. : 14/765222
DATED : May 1, 2018
INVENTOR(S) : Dierberger It is certified that error appears in the above-identified patent and that said Letters Patent is hereby corrected as shown below:

In the Specification

Column 8, Line 6, please delete "noimal" and insert --normal--.

In the Claims

Column 8, Line 43, please delete "cooing" and insert --cooling--.

Signed and Sealed this
Tenth Day of July, 2018

Andrei Iancu
*Director of the United States Patent and Trademark Office*